United States Patent [19]

Johnson

[11] 3,806,828

[45] Apr. 23, 1974

[54] COMBINED HIGH-FREQUENCY BIAS GENERATOR AND AMPLIFIER FOR RECORDING SYSTEMS

[75] Inventor: Keith O. Johnson, Woodland Hills, Calif.

[73] Assignee: Cetec, Inc., North Hollywood, Calif.

[22] Filed: July 26, 1973

[21] Appl. No.: 382,945

[52] U.S. Cl. ............ 331/58, 179/100.2 R, 330/104, 330/109, 331/108 D, 331/117 R

[51] Int. Cl. ............................ H03b 5/08, H03f 1/34

[58] Field of Search ........ 331/58, 59, 108 D, 117 R; 330/1, 26, 104, 109, 112; 179/100.2 R, 100.2 K

[56] References Cited

UNITED STATES PATENTS

| | | | |
|---|---|---|---|
| 3,136,951 | 6/1964 | Taylor, Jr. | 331/58 X |
| 3,637,951 | 1/1972 | Brown, Jr. | 331/108 D X |
| 3,704,349 | 11/1972 | Goshima et al. | 179/100.2 R |

*Primary Examiner*—Herman Karl Saalbach
*Assistant Examiner*—Siegfried H. Grimm
*Attorney, Agent, or Firm*—Harris, Kern, Wallen & Tinsley

[57] ABSTRACT

A self-biasing record system is disclosed wherein a single amplifier is caused both to self-oscillate to provide a high frequency bias signal and to pass a lower frequency information signal to be recorded. The system includes an operational amplifier having positive and negative feedback loops. The positive feedback loop is tuned to pass the intended bias frequency and is provided with a greater gain than the negative loop (at the bias frequency) to sustain oscillation. A gain control (reference) network is positioned in the positive loop to control the bias signal level. The signal to be recorded may be inserted in the negative feedback loop.

6 Claims, 1 Drawing Figure

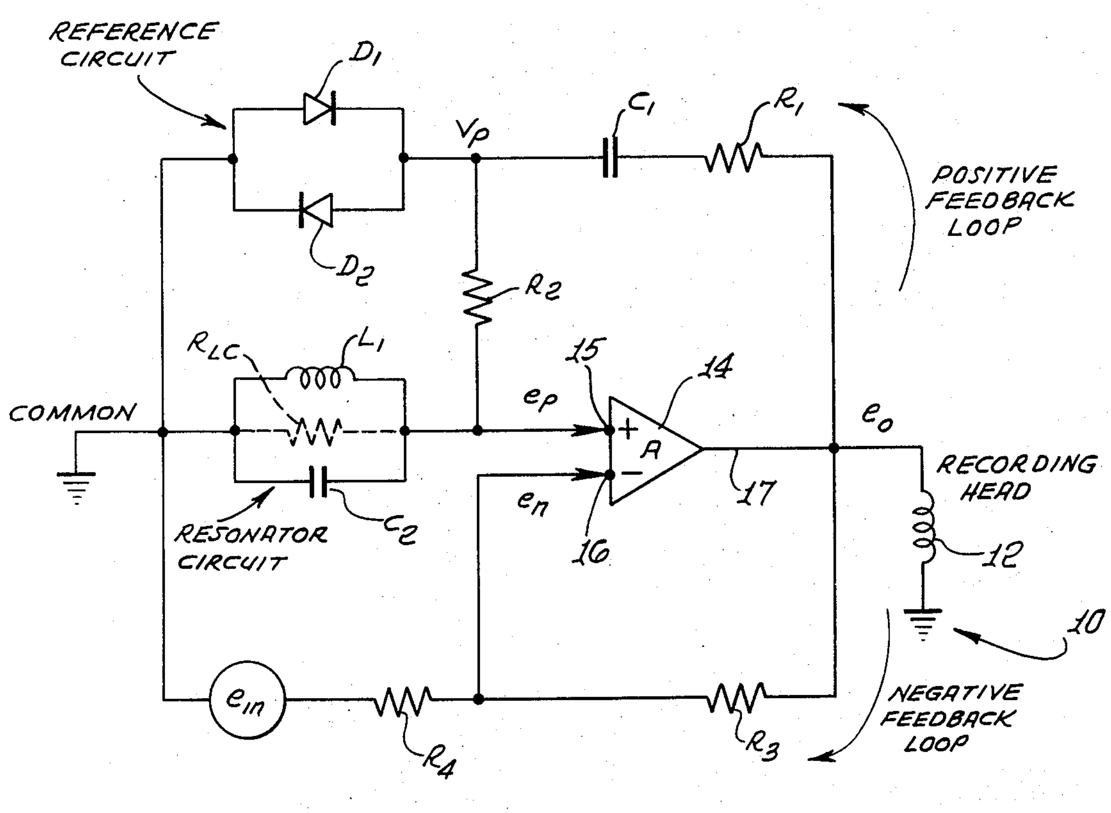
REFERENCE CIRCUIT
D1
D2
Vp
C1
R1
POSITIVE FEEDBACK LOOP
R2
RLC
L1
15
14
COMMON
ep
eo
A
RECORDING HEAD
17
en
RESONATOR CIRCUIT
C2
16
12
10
NEGATIVE FEEDBACK LOOP
ein
R4
R3

COMBINED HIGH-FREQUENCY BIAS GENERATOR AND AMPLIFIER FOR RECORDING SYSTEMS

BACKGROUND OF THE INVENTION

1. Field of the Invention

This invention relates to recording systems and, more particularly, to recording systems for audio and analog recorders wherein a high frequency bias is generated at the record head gap to linearize the recording process.

2. Description of the Prior Art

Many audio and other analog magnetic recorders use a high frequency bias field at the recording head gap to linearize the recording process. Typically, a separate oscillator or oscillator-driven power amplifier is required to supply the bias signal to the recording head windings. Since the signal to be recorded is also applied to the recording head windings via a separate amplifier, some form of tuned filter network is usually required to isolate the separate analog signal and high frequency bias sources.

Systems are also known which pass both the high frequency bias and signals to be recorded through the same amplifier. Such systems, however, have required extremely exotic and costly amplifiers and isolation filter circuitry.

SUMMARY OF THE INVENTION

In accordance with the present invention, a self-biasing record amplifier system is disclosed which uses a single amplifier both to self-oscillate to generate a high frequency bias signal and to pass the signal to be recorded. The requirements for isolation filters and separate oscillators are eliminated. This considerably simplifies the required circuitry and reduces associated costs.

In accordance with the principles of the invention, an operational amplifier is provided with positive and negative feedback loops. The positive feedback loop is provided with a tuned circuit adapted to pass the intended bias frequency. Oscillation occurs when the positive loop has greater gain than the negative loop. A reference level network is provided, preferably in the positive feedback loop, to limit the bias oscillation amplitude to a desired value below the amplifier saturation level. The signal voltage may be injected at the negative feedback terminal.

The system maintains a constant oscillation amplitude independent of amplifier gain and power supply voltages. Since the positive feedback oscillator section does not act on the applied information signal, the biasing and recording functions are independent of one another even though derived from the same amplifier. Further, since both functions are derived from operational amplifier configurations, changes in amplifier gain which might occur from temperature or power supply anomalies are eliminated. A simple, stable and inexpensive system is thus provided for supplying both high frequency bias and information signals to be recorded to magnetic recording heads.

BRIEF DESCRIPTION OF THE FIGURE

The FIGURE is a schematic circuit diagram of an embodiment of a self-biasing record amplifier system constructed in accordance with the principles of the present invention.

DESCRIPTION OF THE PREFERRED EMBODIMENT

Referring now to the FIGURE, there is shown an exemplary high frequency bias and record signal system 10 for driving a magnetic recording head 12. Recording head 12 is preferably of the type adapted to operate at relatively low voltage and high current. A differential operational amplifier 14 is provided having an output terminal 17, and positive and negative input terminals 15, 16, respectively.

A resistor $R_3$ is connected between the amplifier output terminal 17 and negative input terminal 16. The input audio signal to be recorded ($e_{in}$) is coupled to the amplifier negative input terminal 16 from system ground via a resistor $R_4$.

A resistor $R_1$, capacitor $C_1$ and resistor $R_2$ are connected in series electrical configuration between the amplifier output terminal 17 and positive input terminal 15. A diode clipper reference circuit comprising parallel connected oppositely poled diodes $D_1$ and $D_2$ is connected between system common and the junction of resistor $R_2$ and capacitor $C_1$. A capacitive-inductive resonator circuit comprising a parallel connected inductor $L_1$ and capacitor $C_2$ is connected between system common and the positive input terminal 15 of amplifier 14. The LC resonator preferably has a high Q with an effective resistance $R_{LC}$.

The circuit of the FIGURE is adapted both to self-oscillate to generate a desired high frequency bias signal and to pass the lower frequency audio signal to be recorded ($e_{in}$) utilizing the single amplifier 14. The operation of the circuit of the FIGURE may be understood from the following analysis wherein $e_p$ is the voltage at the amplifier positive input terminal 15, $e_n$ is the voltage at the amplifier negative input terminal 16, and $e_0$ is the amplifier output voltage at terminal 17. The effective resistance of the LC resonator is, as above described, $R_{LC}$ and the effective resistance of capacitor $C_1$ is $1/sc$ where $s = j\omega$. Using standard feedback anaalysis the signals $e_p$ and $e_n$ may be determined from the equations:

$$e_p = e_0(R_{LC})/R_{LC} + R_2 + (1/sc) + R_1 \qquad (1)$$

$$e_n = e_0\,(R_4)/R_3 + R_4 + e_{in}(R_3)/R_3 + R_4 \qquad (2)$$

If A represents the gain of amplifier 14, the relationship between the signals $e_p$, $e_n$ and $e_0$ may be determined from the equation:

$$(e_p - e_n)\,A = e_0 \qquad (3)$$

If $R_{LC}$ is large (i.e., $R_{LC}$ is much greater than $R_1 + R_2$), corresponding to a high Q of the LC resonator and $R_3$ is greater than $R_4$ and further assuming $e_{in}$ is 0, then the transfer function of the high frequency bias circuit derived by substituting Equations 1 and 2 into Equation 3 becomes:

$$R_{LC}/R_{LC} + R_1 + R_2 - R_4/R_3 + R_4 \geq 1/A \quad (4)$$

If A is large, which would be the case in a practical operational amplifier, it will be seen that, absent the signal $e_{in}$, oscillation will occur for the condition:

$$1 - R_4/R_3 + R_4 > 0 \quad (5)$$

It is, of course, desirable to limit the amplitude of the high frequency bias signal to below the saturation level of amplifier 14 to allow use of the amplifier for the lower frequency record signals. This function is performed by the limiter diode configuration $D_1$, $D_2$ which functions to limit the positive feedback signal $e_p$ when the output bias signal ($e_{0b}$) exceeds a predetermined level. This will be understood from the following discussion. Assuming that the diodes $D_1$, $D_2$ are selected to initiate conduction when they see a voltage in excess of 1.2 volts (a practical value), then the diodes $D_1$, $D_2$ will conduct when $V_p$ is greater than 1.2 volts peak to peak. Then, substituting in Equation 3.

$$e_0 =(1.2\ R_{LC}/R_{LC} + R_2 - e_0R_4/R_3 + R_4)A \quad (6)$$

for large values of A $$1.2\ R_{LC}/R_{LC} + R_2 \cong e_0R_4/R_3 + R_4 \quad (7)$$

or $$e_{0b} = 1.2\ (R_{LC})\ (R_3 + R_4)/(R_{LC} + R_2)\ (R_4) \quad (8)$$

It will thus be seen that the oscillation voltage level may be controlled by the resistors and diodes and is stable.

The output signal voltage ($e_{0s}$) may be determined by substituting Equations 1 and 2 into Equation 3:

$$e_{0s} = (e_{0s}\ (R_{LC})/R_{LC}+R_2+(1/sc)+R_1 - e_{0s}\ (R_4)/R_3 + R_4 + e_{in}(R_3)/R_3 + R_4)A \quad (9)$$

Again, assuming A is large and, for the signal $e_{in}$, sc is small, which would be the case since the frequency of the signal to be recorded is much lower than that of the bias frequency, then:

$$1/A = -R_4/R_3 + R_4 + e_{in}(R_3)/e_{0s}(R_3 + R_4) \cong 0 \quad (10)$$

The ratio of the output signal $e_{0s}$ to the audio input signal $e_{in}$ is then given by the equation:

$$e_{0s}/e_{in} \cong R_3/R_4 \quad (11)$$

It will thus be seen that the output signal voltage ($e_{0s}$) is independent of the amplifier gain and bias amplitude and, in the embodiment shown in the FIGURE, is merely a function of the relative values of the resistors $R_3$ and $R_4$.

The circuit of the FIGURE thus provides both the high frequency bias signal of determined maximum amplitude and the audio signal to be recorded using stable operational amplifier configurations requiring but a single amplifier.

In the preferred embodiment described, the high frequency bias signal amplitude stability is achieved by limiting the maximum positive feedback signal $e_p$ supplied to positive input terminal 15. In effect this limits the differential bias signal applied to terminals 15 and 16 of amplifier 14. Obviously, the same effect could be achieved by controlling the signal levels in the negative feedback loop as opposed to those in the positive feedback loop. Further, an automatic gain control circuit could be substituted for the diode clipper circuit of the FIGURE. Other equivalent approaches will be evident to those skilled in the art.

Accordingly, the scope of the invention is not to be limited by the details of the preferred embodiment described but only by the appended claims.

I claim:

1. A self-biasing record system comprising:
- a high gain differential operational amplifier having positive and negative feedback loops;
- means for causing the positive feedback loop to have a gain greater than the negative feedback loop at a preselected frequency to cause said differential operational amplifier to self-oscillate at said preselected frequency;
- means for coupling an input signal of lower frequency than said preselected frequency to said amplifier;
- means for controlling the amplitude of said preselected frequency signal to a level below the saturation level of said amplifier whereby said amplifier will not be in a saturated condition and will have as an output signal both said preselected frequency signal and the amplified input signal.

2. The system of claim 1 wherein said amplitude controlling means comprises:
- reference voltage means for limiting the gain in said positive feedback loop.

3. The system of claim 2 wherein said reference voltage means comprises:
- a diode limiter shunting the positive feedback loop, said diode limiter providing a reference voltage level defining said positive loop voltage.

4. A self biasing record system comprising:
- a high gain differential operational amplifier having an output terminal and positive and negative input terminals;
- means connected between said output terminal and said positive input terminal defining a positive feedback loop;
- means connected between said output terminal and said negative input terminal defining a negative feedback loop;
- means for causing said positive loop to have a gain greater than said negative loop at a preselected frequency whereby said differential operational amplifier will self-oscillate at said preselected frequency;
- means for controlling the amplitude of said preselected frequency signal to a level below the saturation level of said amplifier;

means for coupling an input signal of lower frequency than said preselected frequency to one of said amplifier input terminals, whereby said amplifier will self-oscillate in a non-saturated condition and will have an output signal functionally related to said preselected frequency signal and said input signal.

5. The system of claim 4 wherein said means for coupling an input signal includes means for connecting the input signal between said negative input terminal, and circuit ground, and including a resonator circuit for said preselected frequency connected between said positive input terminal and circuit ground.

6. The system of claim 5 wherein said means for controlling the amplitude includes reference voltage means limiting the gain in the positive feedback loop and connected between said positive input terminal and circuit ground.

* * * * *